United States Patent

Rediker

[15] 3,636,471

[45] Jan. 18, 1972

[54] METHOD OF AND APPARATUS FOR ENHANCING RADIATION FROM INDIRECT-GAP SEMICONDUCTORS

[72] Inventor: Robert H. Rediker, Newton, Mass.

[73] Assignee: Massachusetts Institute of Technology, Cambridge, Mass.

[22] Filed: July 3, 1969

[21] Appl. No.: 838,795

[52] U.S. Cl. ..........................331/94.5, 313/108 D, 317/235

[51] Int. Cl. .........................................H01s 3/18, H01s 3/09

[58] Field of Search ...............331/94.5; 313/108 D; 317/235

[56] References Cited

UNITED STATES PATENTS 3,305,685 2/1967 Shyh Wang.......................331/94.5 X

*Primary Examiner*—Ronald L. Wibert
*Assistant Examiner*—R. J. Webster
*Attorney*—Thomas Cooch, Martin M. Santa and Robert Shaw

[57] ABSTRACT

Apparatus is disclosed for injecting phonons of appropriate frequency and intensity into the luminescent regions of an indirect-gap semiconductor to enhance luminescence therein. If the luminescent region is an optical resonant cavity in which an inverted population of the electric energy levels or bands of the semiconductor exists, the injected phonons can function to initiate and/or enhance lasing action in the region.

21 Claims, 5 Drawing Figures

INVENTOR:
ROBERT H. REDIKER
BY Robert Shaw
ATTORNEY

PATENTED JAN 18 1972 3,636,471

SHEET 2 OF 2

INVENTOR:
ROBERT H. REDIKER
BY Robert Shaw
ATTORNEY

METHOD OF AND APPARATUS FOR ENHANCING RADIATION FROM INDIRECT-GAP SEMICONDUCTORS

The invention herein described was made in the course of work performed under a contract with the Department of the Air Force, Electronics Systems Division.

The present invention relates to indirect-gap semiconductor devices adapted to luminesce and lase under appropriate conditions, there being provided means for injecting phonons of appropriate frequency and intensity into the luminescent region of the devices to enhance luminescence therein, and, also, to initiate lasing or enhance existing lasing action.

As a rule the photoluminescent and electroluminescent efficiencies of indirect-gap semiconductors of the type herein described are extremely low; for example, in silicon the radiative quantum efficiency is of the order of $10^{-5}$ even at low temperature. An object of the present invention, accordingly, is to provide a method of increasing said efficiencies, the increase being effected by injecting phonons of particular frequency and intensity into the luminescent region of the semiconductor.

Because of the mentioned inefficiencies, it has not heretofore been possible to attain lasing action in indirect-gap semiconductors. Another object of the present invention is, therefore, to provide an indirect-gap semiconductor laser, lasing being initiated and enhanced by injection of such phonons.

When an indirect-gap semiconductor is used as a laser in accordance with present teachings, it has the characteristic of being able to maintain an inverted population for times up to milliseconds (the lifetime in the semiconductor) before being discharged and thereby store energy in the semiconductor laser for times up to milliseconds. It is possible to release such stored energy to generate pulses of high-energy laser transmissions using the energy stored. Still another object of the invention is directed to taking advantage of that unusual storage characteristic by providing means to trigger lasing in an indirect-gap semiconductor by injecting bursts of appropriate phonons into the laser region thereof during the time said inverted population is being stored to effect lasing as high-energy laser pulses.

A further object is to provide phonon-enhanced radiation in semiconductors. Other and still further objects are contained in the description to follow and are particularly pointed out in the appended claims.

Broadly, and by way of summary, the objects of the invention are attained in apparatus adapted to inject phonons of proper frequency and intensity into regions of an indirect-gap semiconductor in which a nonequilibrium condition exists, thereby to enhance the probability of radiative recombination of the nonequilibrium elements in said regions. For example, nonequilibrium can be an excess of charge carriers, as electrons and/or holes, or it can be an inverted population of the electronic energy levels or bands of the semiconductor.

The invention will now be explained with reference to the accompanying drawings in which.

Prior to a detailed discussion of the invention with reference to the drawings, a brief general discussion of the concepts involved is in order. The exposition herein is directed to situations in which luminescence results from radiative recombination of charge carriers from a previously established nonequilibrium condition, the luminescence being enhanced by injection of phonons of appropriate frequency and intensity. Under proper circumstances laser action is initiated and/or enhanced by such phonons injected into the active part of the semiconductor.

The dominant mode of radiative recombination in indirect-gap semiconductors, such as, for example, intrinsic silicon diodes, is a second order process involving transition to an intermediate virtual state and thence direct recombination from the virtual state. The transition is phonon-assisted in that ($\Delta k_{cv}$), the crystal momentum difference between the conduction band minimums labeled 27 and 28 in FIG. 5 and the valence band maximum labeled 25, is added to or taken from the recombining electron respectively through the annihilation or creation of a phonon in the course of such transition. Phonons of the appropriate frequency and intensity to maintain crystal momentum conservation during the transition are emitted during band-to-band tunneling in silicon diodes; as explained in later paragraphs, a preferred means for creating the desired phonons is to provide a tunnel junction region in the semiconductor structure and impress an electric potential across the junction to produce an electric current and said phonons.

Figure 1:
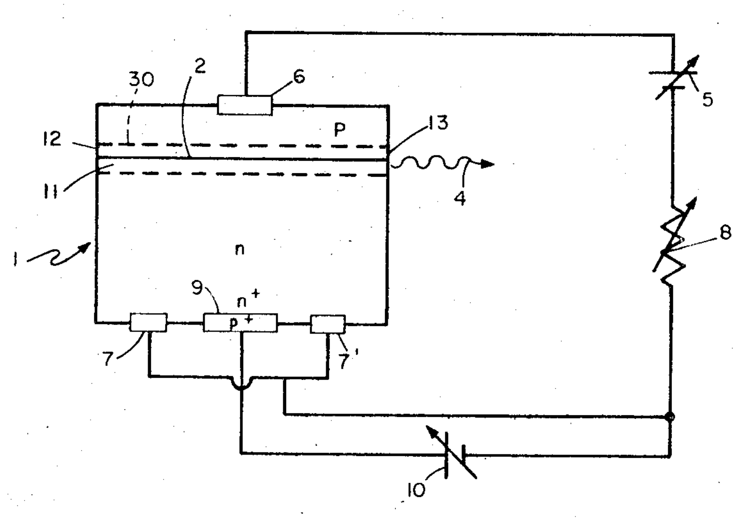
FIG. 1 is a schematic circuit diagram of semiconductor device adapted to luminesce and/or lase, pumping energy to the device being provided by forward-biasing the semiconductor and phonons for purposes herein discussed being produced at a tunnel junction of the device.
Figure 2:
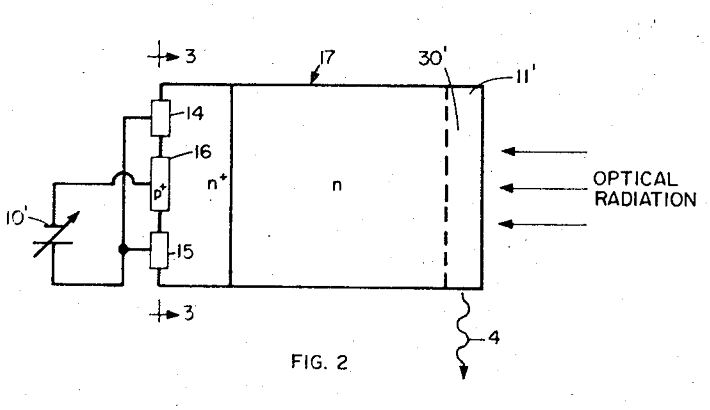
FIG. 2 shows, schematically, a modification of the apparatus of FIG. 1, the pumping energy being supplied to the semiconductor shown by an external radiation source.
Figure 4:
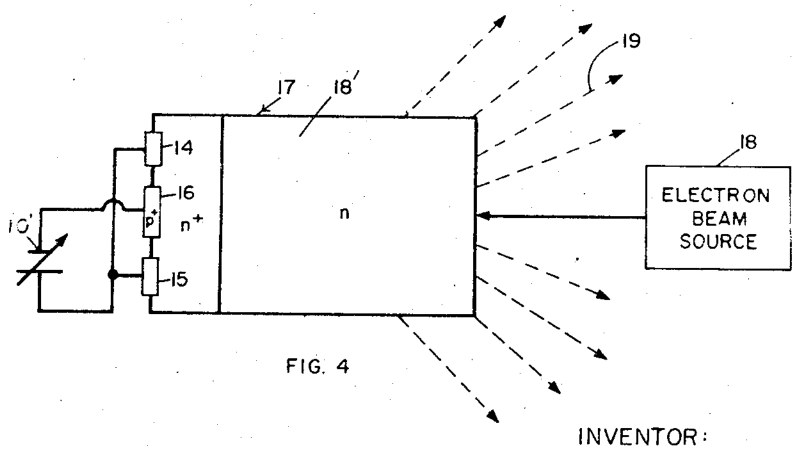
FIG. 4 is a schematic representation of a semiconductor device adapted to luminesce in response to electron beam pumping.

Indirect-gap semiconductor material includes silicon, germanium, and gallium phosphide, among others. Such material can be made to luminesce, but, prior to the present invention, lasing had not been accomplished. Lasing occurs in the semiconductor shown in FIG. 1 in which dopants have been used to establish the N- and P-regions therein, under the conditions herein disclosed, at the thin planar junction shown at 2 between the N- and P-regions thereof. It should be pointed out that the region in which lasing can take place is one of finite thickness at and near the PN-junction. Thus, the laser medium shown at 11 in FIG. 1 is that portion of the semiconductor disposed within the optical resonant cavity 30 discussed hereinafter. Pumping energy is directed to the laser medium 11 to produce an inverted population of energy states so that electromagnetic radiation therein is amplified by the process of stimulated emission. The pumping of the medium can be effected by forward biasing the semiconductor, as shown in FIG. 1, by optical pumping, as shown in FIG. 2, and by electron-beam pumping, as shown in FIG. 4. The pumping may be at a level adequate to establish luminescence only in the medium, or it may be sufficiently great to establish an inverted population of the electronic energy levels or bands. Once luminescence has been created, it can be enhanced, in accordance with the present teaching, by injecting appropriate phonons into the active part of the medium; and, once an inverted population of the energy states has been created, lasing can be initiated and lasing can be enhanced by injecting appropriate phonons, first into the part of the medium in which the inversion exists and second into the active part of the medium in which lasing, once established, exists. In FIGS. 1 and 2 the respective resonant cavities are labeled 30 and 30′ and lasing occurs along the optical axis of each at radiation frequencies determined by the properties of the semiconductor and by the distance between optically parallel reflecting surfaces 12 and 13 at the ends of the cavity and the index of refraction of the medium therebetween. In FIG. 2 the laser medium is numbered 11′ and is a thin layer immediately adjacent the semiconductor surface. The optical pumping of FIG. 2 could be replaced by the electron-beam pumping of FIG. 4 with similar results. As used herein, the terms "optical," "luminescence" and " lasing radiation" (and derivations therefrom) embrace radiation in the visible, the infrared, and the ultraviolet portions of the spectrum.

Referring again to FIG. 1, a diode laser structure is shown at 1 comprising $P^+$, $N^+$, N- and P-regions, the junction 2 between the P- and the N-regions being the region in which lasing occurs under appropriate circumstances, as mentioned. The laser at the PN-junction region forms the optical resonant cavity 30 (see Letters Patent U.S. Pat. No. 3,258,718 issued to the present inventor and others on June 28, 1966 for a detailed discussion of such cavities); external mirrored surfaces (not shown) can be used to assist the reflectant surfaces 12 and 13 within the crystal, in which event the optical resonant cavity would comprise the cavity 30 plus the further region between the mirrors. Emission of a laser beam 4 from the optical cavity is effected by providing one surface that is not totally reflecting, as is well known.

An inverted population of the electronic energy levels or bands in the diode 1 in the embodiment of FIG. 1 is established by forward biasing the diode at the junction 2 at which luminescence and lasing occurs by the use of a potential source 5 connected to ohmic contacts 6 and 7—7′ of the diode through a variable resistance 8. Phonons to enhance the probability of recombination of the nonequilibrium elements thus created are furnished by a tunnel junction 9 which is the region between the $P^+$- and $N^+$-regions of the semiconductor structure. A source of variable electric potential 10 is impressed across the junction 9 to the ohmic contacts 7—7′ to produce both an electric current and the required phonons. As previously mentioned, indirect-gap semiconductors have very low photo and electroluminescent efficiencies, even at low temperature. The present invention serves to improve the luminescent efficiency, and can initiate and enhance lasing action. In the latter situation the inverted population can be built up and stored (up to a millisecond lifetime in the semiconductor), recombination being triggered by a burst of phonons injected into the laser region of the semiconductor to furnish a high-peak power, pulsed discharge.

Figure 5:
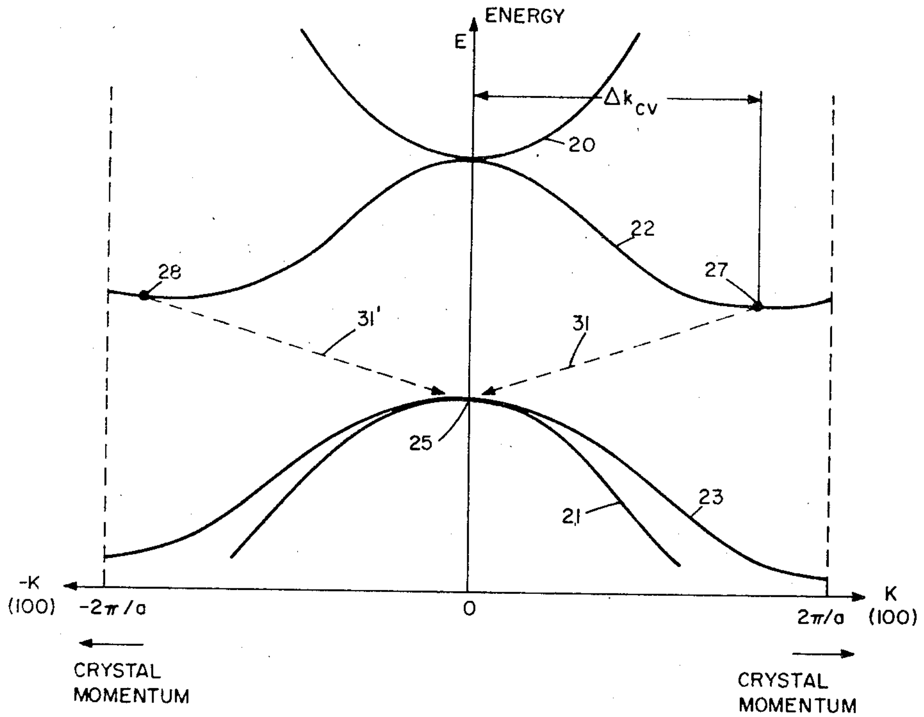
FIG. 5 is a representation of the energy-band structure of an indirect-gap semiconductor, the energy of the charge carriers in the band being shown as a function of the crystal momentum.

Recombination of charge carriers to provide luminescence and/or lasing action occurs through the mechanism of transitions from band-to-band, band-to-electronic energy level, electronic energy level-to-electronic energy level, and electronic energy level-to-band. In FIG. 5 the curves 22 and 23 represent the conduction and valence bands structure, respectively, of a silicon indirect-gap semiconductor. The electrons in the conduction band exist around points 27 and 28 with crystal momentum about $\Delta k_{cv}$ and energy $E_c$; the holes in the valence band exist around point 25 with about zero crystal momentum and energy $E_v = E_c - E_g$, where $E_g$ is the energy gap of silicon. The exact energy-crystal momentum relationships for the electrons and holes are given by the curves 22 and 23 which are parabolic about the points 27(28) and 25, respectively, In a band-to-band recombination of an electron and hole, represented in FIG. 5 by the dotted lines 31(31′) between points 27(28) and 25, for crystal momentum to be conserved, the amount $\Delta D_{cv}$ must be taken up by, for example, the emission or absorption of a phonon. The electronic energy levels are often near the bands, in material of interest.

The probability of band-to-band recombination or other transition in which a phonon is emitted is proportional to $(N_P+1)$, where $N_P$ is the phonon occupation number for the mode involved. The unity factor arises from the spontaneous phonon emission process and the factor $N_P$ from the stimulated process. Similarly, the probability of a recombination in which a phonon is absorbed is proportional to $N_P$. The equilibrium value of $N_P$ is given by the Einstein-Bose distribution function. For example, phonons with the wave vector ($\Delta k_{cv}$ in FIG. 5) required in the band-to-band recombination process in a silicon indirect-gap semiconductor, have energies of 0.018 and 0.058 electron volts for the acoustic and optical phonon branches, respectively; at 77° K. the equilibrium values of $N_P$ for silicon are $7\times10^{-2}$ and $2\times10^{-4}$ and at 4.2° K. the values are $2\times10^{-23}$ and $4\times10^{-74}$. Consequently, at temperatures below 77° K. only the spontaneous phonon-emission peak has an appreciable amplitude. Appropriate phonons for band-to-band recombination in silicon have a frequency of about $1.4\times10^{13}$ Hz. for optical phonons and about $4.4\times10^{-2}$ Hz. for acoustic phonons.

In order to estimate the range of modification in luminescent intensity attainable, it is possible to calculate the increment in the occupation numbers $N_P$ for the modes of interest. Since the phonons propagate from the tunnel junction at their respective group velocities $v_g$, the density generated within a phonon mean-free path of the junction is of the order of $J_u/qv_g$, where $J_u$ is the tunneling current density associated with phonon emission and $q$ is the electronic charge. The phonon spectrum is not purely monochromatic because the electric field of the tunnel junction perturbs the periodic potential of the silicon lattice, but the phonons are generated with a sharply peaked distribution of wave vectors about $\Delta k_{cv}$. The width of the peak is reciprocal lattice space is given through the uncertainty principle as the reciprocal of the distance between the classical turning points of the tunnel junction. The phonon modes can occupy a volume in $k$-space of $$\frac{M4\pi(\delta k)^3}{3},$$

where $M$ is the number of equivalent minima in the conduction band and $\delta k$ is the width of the phonon distribution. The density of modes in $k$-space is $V/8\pi^3$, $V$ being the volume of the crystal. The total number of modes $N_e$ which can be excited is, then, $$N_e = \frac{M4\pi}{3}(\delta k)^3 \cdot (V/8\pi^3) \cdot$$

The numerical value of the increase in the average occupation number $N_P$ due to phonon generation is obtained by dividing the phonon density near the junction by the number of modes which can be excited. Using a tunneling current density of 10 amperes/cm.$^{-2}$, for example, it is possible to obtain a value of $N_P$ of 10, (this value is an increase by many orders of magnitude over the equilibrium values of the occupation numbers given above), an enhancement of the spontaneous emission peak by a factor of 10, and an enhancement by a factor of 100,000 of the luminescence associated with the absorption of transverse optical phonons at 77° K. The control of the luminescence associated with phonon absorption by phonon generation becomes even more spectacular as the temperature is decreased and the phonon distribution function is driven further from equilibrium. The diode current assigned to tunneling associated with phonon emission in the calculation of $N_P$ above was purposefully chosen smaller than that which is practically available in order to show the relative ease in obtaining significant changes in the luminescence.

In FIG. 2 the indirect-gap $P^{-+}N^{-+}N$-semiconductor device shown at 17 is pumped by optical lumination, as before-mentioned. Phonons for present purposes are generated at a tunnel junction 16 between the $P^{-+}$ and $N^{-+}$ regions of the device 17. A source of variable electric potential 10′ is imposed across the junction to ohmic contacts 14 and 15 to produce both an electric current and the appropriate phonons. The frequency of the phonons is determined by the band structure of the semiconductor, and, since the lasing and tunnel-junction region are composed of the same indirect-gap semiconductor material, appropriate phonons for this material are produced. The intensity of the phonons is determined mostly by the electric current across the tunnel junction 16, which, in turn, is controlled by the input potential from the source 10′.

Figure 3:
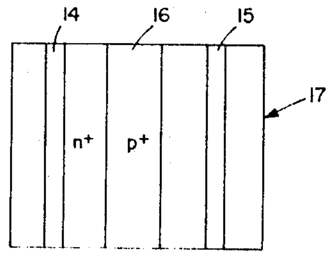
FIG. 3 is a view taken upon the line 3—3 in FIG. 2 looking in the direction of the arrows.

The device in FIG. 4 can be the same as that illustrated in FIGS. 2 and 3 except that now an electron beam source 18 replaces optical pumping (optical pumping can be used, however) to the active part of the semiconductor and no optical cavity is shown. The pumping energy from the electron beam establishes an excess of charge carriers, as electrons and/or holes, in the luminescent region or active part 18′ of the semiconductor 17. Again, phonons of appropriate frequency and intensity to enhance luminescence, as represented by arrows 19, are generated at the tunnel junction 16.

The intensity of phonon-enhanced luminescence can be modified by changing the output of the variable potential sources 5, 10, and 10′ to modulate the diode current across the junction 2 and the tunnel-diode junctions 9 and 16, respectively, or by making changes in the optical radiation input or the electron beam input.

The luminescent efficiency of semiconductors as a rule is higher at lower temperatures (i.e., 77° K. and below), but it is possible using phonon injection at room temperature to enhance the luminescence so that lasing at room temperature can occur even on a continuous basis. Modification of the invention herein described, including substitution of other semiconductor materials for those herein disclosed, will occur to persons skilled in the art.

What is claimed is:

1. A method of enhancing luminescence of an indirect-gap semiconductor, that comprises, establishing an excess of charge carriers in the semiconductor in the luminescent region thereof, and injecting phonons of appropriate frequency and intensity into said region to enhance the probability of radiative recombination of the carriers across the indirect gap, said appropriate frequency being that which is required to take up the crystal momentum change of the recombining carriers.

2. A method as claimed in claim 1 in which the charge carriers are at least one of electrons and holes and the excess is established by forward biasing the semiconductor.

3. A method as claimed in claim 1 in which the charge carriers are at least one of electrons and holes and the excess is established by electron beam pumping.

4. A method as claimed in claim 1 in which the charge carriers are at least one of electrons and holes and the excess is established by optical pumping.

5. A method of enhancing luminescence of an indirect-gap semiconductor, that comprises, directing pumping energy to the semiconductor to effect luminescence in the active part thereof, and injecting phonons of appropriate frequency and intensity into said active part to enhance the probability of radiative recombination across the indirect gap of charge carriers therein, the appropriate frequency of the phonons being that which is required to take up the crystal momentum change of the recombining charge carriers.

6. A method as claimed in claim 5 in which the pumping energy is sufficiently great to establish an inverted population of the electronic energy levels or bands in an indirect-gap semiconductor having an optical resonant cavity which includes at least a portion of said active part, the phonons being effective to enhance the probability of radiative recombination of the charge carriers from the energy levels or bands to effect lasing and to enhance any existing lasing.

7. A method as claimed in claim 5 in which a tunnel-diode junction is provided in the semiconductor and an electric potential is impressed across the junction to provide an electric current and said phonons.

8. A method of initiating and enhancing lasing action of an indirect-gap semiconductor, that comprises, establishing an inverted population of at least one of the electronic energy levels and bands in an indirect-gap semiconductor forming at least part of an optical resonant cavity, and injecting phonons of appropriate frequency and intensity into the optical cavity to enhance radiative recombination across the indirect gap of the electrons from the inverted population levels and bands to initiate said lasing and to enhance any existing lasing, said appropriate frequency of the phonons being that which is required to take up the crystal momentum change of the recombining electrons from the energy levels or bands.

9. A method as claimed in claim 8 in which a tunnel-diode junction is provided in the semiconductor, and an electric potential is impressed across the junction to provide an electric current and said phonons.

10. A method as claimed in claim 8 in which the inverted population is stored in the semiconductor and in which lasing is triggered by a burst of said phonons, thereby to provide high-peak power laser output.

11. A method as claimed in claim 8 in which the inverted population is effected by optical pumping.

12. A method as claimed in claim 8 in which the inverted population is effected by forward biasing a diode.

13. A method as claimed in claim 8 in which the inverted population is effected by electron beam pumping.

14. A method of enhancing luminescence of a semiconductor, that comprises, injecting phonons of appropriate frequency and intensity into the luminescent region of the semiconductor to enhance the probability for radiative recombination of at least one of electrons and holes therein, said appropriate frequency being that which is required to take up any crystal momentum change of the recombining electrons and holes.

15. A semiconductor laser that comprises a diode laser structure of an indirect-gap semiconducting material forming at least part of an optical resonant cavity, means for establishing an inverted population of the electronic energy levels or bands of the semiconductor, and means for injecting phonons of the appropriate frequency and intensity to enhance radiative recombination across the indirect gap of the electrons from the inverted population levels or bands to provide lasing action, said appropriate frequency of the phonons being that which is required to take up the crystal momentum change of the recombining electrons.

16. A semiconductor laser as claimed in claim 15 in which the semiconductor is silicon and the frequency is about $1.4\times10^{13}$ Hz. for optical phonons and about $4.4\times10^{12}$ Hz. for acoustic phonons.

17. A semiconductor laser as claimed in claim 15 in which the phonon injection means comprises a tunnel-junction region in the semiconductor structure and having an electric potential impressed thereacross to produce both an electric current and said phonons.

18. A semiconductor laser as claimed in claim 15 in which the inverted population is established by forward biasing the semiconductor at the semiconductor junction at which lasing occurs.

19. An indirect-gap semiconductor adapted to luminesce, that comprises, means for establishing an excess of charge carriers in the luminescent region of the semiconductor and means for enhancing the probability of recombination of the charge carriers across the indirect gap of the semiconductor, said means for enhancing comprising means for generating and injecting phonons of appropriate frequency and intensity into said region, said appropriate frequency of the phonons being that which is required to take up the crystal momentum change of the recombining charge carriers.

20. An indirect-gap semiconductor as claimed in claim 19 in which the means for generating and injecting phonons includes a tunnel junction which is formed as part of the semiconductor and of the same semiconductor material as the luminescent region to provide a band structure in the tunnel junction that corresponds to the band structure in the luminescent region thereby to furnish phonons of appropriate frequency.

21. An indirect-gap semiconductor as claimed in claim 20 that further includes a source of electric potential connected across the tunnel junction to produce both the phonons and an electric current, the intensity of the phonons thereby produced being determined by the magnitude of the electric current.

* * * * *